Jan. 26, 1932.    I. H. JUDD    1,842,985
SKID ASSEMBLY
Filed Jan. 19, 1931    2 Sheets-Sheet 1
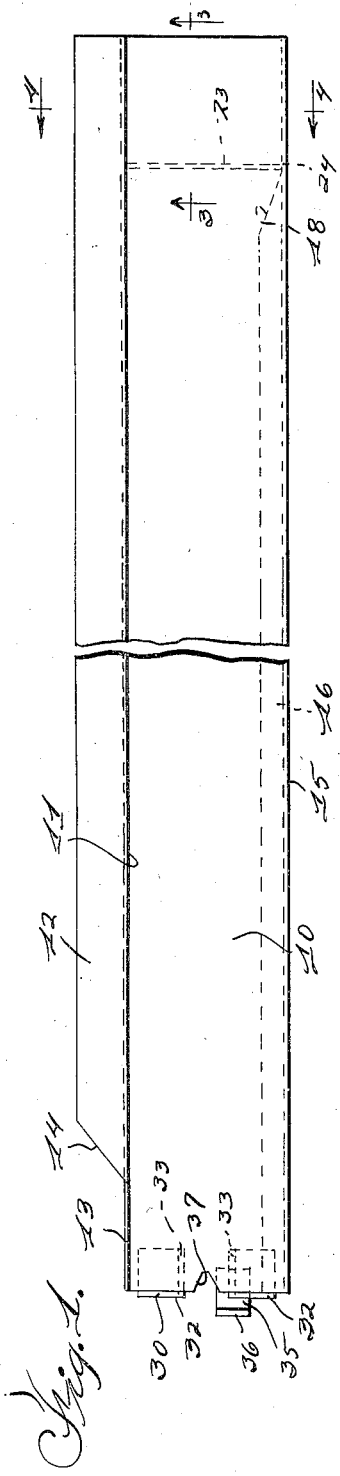
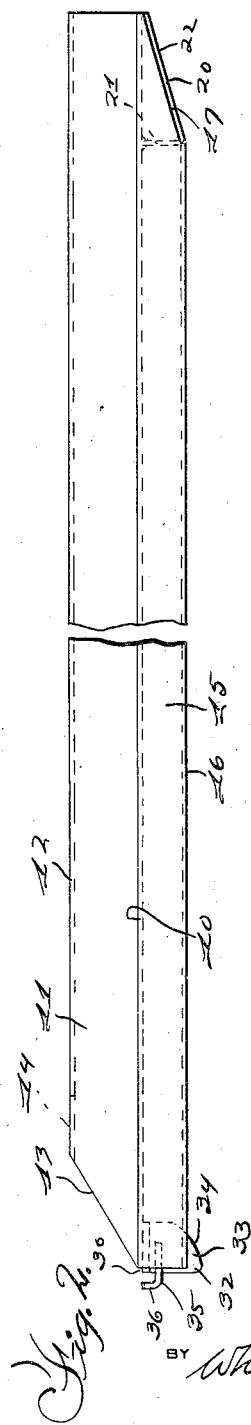
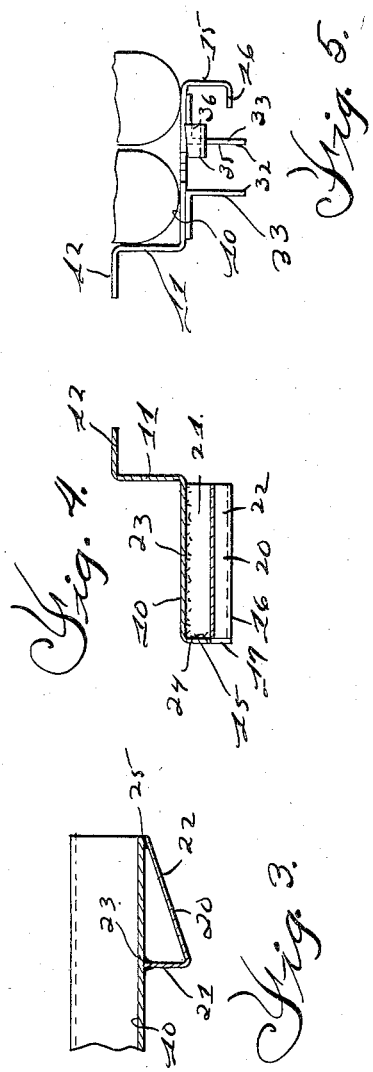
INVENTOR
Irving H. Judd
BY Whittemore, Hulbert, Whittemore & Belknap
ATTORNEYS Jan. 26, 1932.   I. H. JUDD   1,842,985
SKID ASSEMBLY
Filed Jan. 19, 1931   2 Sheets-Sheet 2
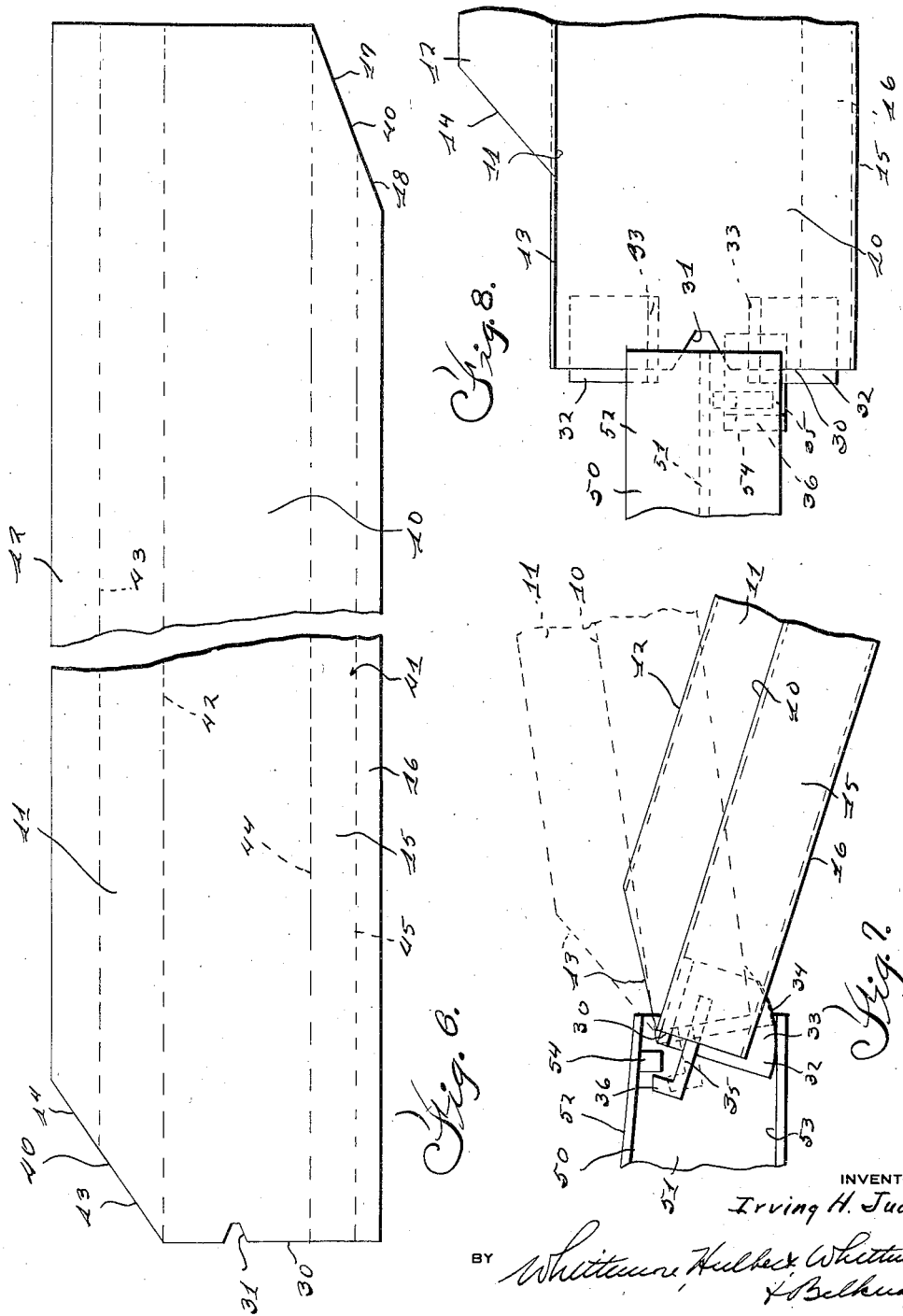
INVENTOR
Irving H. Judd
BY
ATTORNEYS Patented Jan. 26, 1932

1,842,985

UNITED STATES PATENT OFFICE

IRVING H. JUDD, OF DETROIT, MICHIGAN, ASSIGNOR TO WHITEHEAD & KALES COMPANY, OF RIVER ROUGE, MICHIGAN, A CORPORATION OF MICHIGAN

SKID ASSEMBLY

Application filed January 19, 1931. Serial No. 509,849.

This invention relates to skids and has particular reference to a skid adapted for use in the loading of automobiles and the like on a vehicle.

One of the primary objects of this invention is to provide a skid which will be light in weight and yet be sufficiently strong to withstand all normal uses to which it will be subjected.

The invention further contemplates the provision of a skid which may be used in the loading of both single wheel passenger automobiles and dual wheel trucks or the like.

Still further the invention contemplates the provision of a skid which will at all times be properly positioned relative to the vehicle being loaded, regardless of irregularities of the ground, and the provision of means for firmly holding the skid against movement during the loading operation.

Numerous other objects and advantages of this invention will become more apparent as the following description proceeds, particularly when reference is had to the accompanying drawings, wherein:

Figure 1 is a plan view of a skid constructed in accordance with the teachings of this invention;

Figure 2 is a side elevational view of the skid shown in Figure 1;

Figure 3 is a sectional view taken substantially on the line 3—3 of Figure 1;

Figure 4 is a sectional view taken substantially on the line 4—4 of Figure 1;

Figure 5 is an end elevational view of the skid;

Figure 6 is a plan view of a blank from which the skid may be developed;

Figure 7 is a semi-diagrammatic side elevational view showing the method of attaching one end of the skid to a vehicle to be loaded; and Figure 8 is a top plan view showing the skid in loading position.

Referring then particularly to the drawings wherein like reference characters designate corresponding parts throughout all views, the numeral 10 designates the floor of a skid constructed in accordance with the teachings of this invention, this floor being of sufficient width to form a track for the wheels on one side of an automobile or the like being loaded on a vehicle. It will be understood that the skids will be used in sets of two, and that when so used, the two skids together will constitute a track on which an automobile or the like may be run from the ground to a position on a trailer or the like. The skid shown in the drawings might be termed the left hand skid in that it constitutes a track for the wheels on the left side of the automobiles or the like during the loading operation, and the other skid of the set will be similar to the skid shown in the drawings with the exception that the upturned and downturned flanges hereinafter to be described will be arranged on the edges of the floor opposite to the edges shown in the drawings.

The floor 10 is elongated, being of sufficient length to extend at an inclination from the ground to the rear end of the vehicle to be loaded, and this floor is provided at its inner edge with the upstanding flange 11 which constitutes a guide. The flange 11 terminates at its upper end in a laterally and inwardly extending flange 12 which tends to reinforce the skid and which functions as a compression member when the skid is loaded. The guide flange 11 is preferably cut on a bias at the forward end of the skid, as indicated by the reference character 13, while the reinforcing flange is likewise cut on a bias, as designated by the reference character 14. By inclining the forward edge of the flange 11 in the manner disclosed, this flange will clear the rear end of the vehicle to which the skid is connected.

At its outer edge the floor of the skid is provided with a depending flange 15 which terminates at its lower end in an inwardly directed reinforcing flange 16 which constitutes a tension member when the skid is loaded. At the rear end of the skid the flange 15 is cut on a bias, as designated by the reference character 17, and the reinforcing flange 16 is similarly cut, as designated by the reference character 18. The inclined edge of the flange 15 provides for the mounting of an end support on the rear end of the skid, as will hereinafter be more fully brought out.

As shown in Figures 3 and 4 of the drawings, a plate 20 is bent to provide the portions 21 and 22 angularly arranged with respect to each other. The plate 20 is of a width substantially equal to the floor 10 of the skid and is secured to the under side of the floor of the skid adjacent the rear end thereof. Thus the upper edge 23 of the portion 21 of the plate is welded to the under face of the floor of the skid at a point spaced from the end thereof, while the side edge 24 of the portion 21 of the plate is welded to the adjacent inner face of the flange 15 of the skid. The portion 21 is of a length substantially equal to the depth of the flange 15 and the portion 22 extends at an inclination from the lower edge of the portion 21 to the rear edge 25 of the floor to which edge it is secured as by welding or the like. Thus, the plate 20 constitutes an end support and reinforcing member for the skid.

Formed in the front edge 30 of the floor 10 and substantially centrally thereof, is a V-shaped notch 31 and welded to the under face of the floor 10 on opposite sides of this notch are angle plates 32. These angle plates provide the downwardly extending legs 33 which terminate at their lower ends in rounded edges 34 for a purpose which will hereinafter be more fully described. A plate-like member 35 is slotted to embrace one of the legs 33 and is welded to this leg and this plate-like member terminates at its free end in an upwardly turned hook portion 36, the upper edge of which is beveled and also inclined, as clearly illustrated in Figures 2 and 5 of the drawings.

It constitutes a feature of this invention that the main body portion of the skid which includes the floor, guide and reinforcing flanges thereof, may be developed from a single piece of flat sheet metal. Thus, starting with an elongated rectangular shaped piece of flat sheet metal, the corners of this sheet may be cut on the lines 40 to provide a blank designated generally by the reference character 41 in Figure 6 of the drawing. The notch 31 may then be cut in the one edge of the blank and substantially centrally of this edge, and one side of the blank may then be bent upwardly on the line designated by the reference character 42. The upwardly bent portion of the blank may then be bent laterally on the line 43 so that the flanges 11 and 12 are formed on the one side of the blank. At its opposite edge the blank may then be bent downwardly on the line 44 to provide the flange 15 and this portion of the blank may again be bent inwardly on the line 45 to provide the reinforcing flange 16. Thus, by a series of bending and cutting operations which may be carried on in any desired order, the body section of the skid may be formed of a single elongated piece of flat sheet metal.

A skid constructed in accordance with the teachings of this invention is adapted more particularly for use with a trailer or the like which includes longitudinally extending I-beams which constitute tracks for the wheels of vehicles to be carried. In Figures 7 and 8 one of these I-beams is shown and a skid constructed in accordance with the teachings of this invention is shown in full lines operatively associated with the rear end of this I-beam. Thus, referring to these figures of the drawings, the reference character 50 constitutes an I-beam of a trailer or the like, this I-beam having the web 51, the top 52, and the base 53. Welded to the under face of the top 52 and on one side of the web is a block 54 which extends downwardly in position to be engaged by the hooked end 36 of the member 35. Thus, when the skid is associated with the end of the I-beam, the skid may be raised to the dotted line position shown in Figure 7 of the drawings, at which time the hook may be positioned in back of the block 54, after which the free end of the skid may be lowered to position the skid as shown in full lines on the drawing, at which time the hook will be engaged with the block carried by the I-beam. Thus, the hook will prevent the skid from moving rearwardly away from engagement with the end of the I-beam while the web of the I-beam projecting into the notch 31 will prevent forward movement of the skid. The skid will also be held against lateral movement and up and down movement, as will be readily apparent.

When the skid is operatively associated with the rear end of an I-beam, as shown in Figures 7 and 8 of the drawings, the forward end of the skid will be positioned under the top of the I-beam so that a vehicle supported on the I-beam will rest entirely upon the I-beam and not upon the end of the skid. Thus, the skid may be readily removed after the vehicles are loaded on the track and may be placed in loading position with respect to the track when it is desired to remove the vehicles from the track.

The angle plates 32 constitute supports for the forward end of the skid and it will be noted that the rounded lower edges of the legs of these angle plates rest upon and are supported by the upper faces of the base of the I-beam. Thus, the rounded edges of the legs 33 constitute cam surfaces which permit the skid to firmly engage the ground regardless of unevenness in the ground, so that the skid will always be mounted firmly in loading position during use.

It will further be noted that although the floor of the skid is reinforced by flanges arranged at the opposite edges thereof, these flanges are so arranged that the skid is adapted for use in the loading of either single wheel passenger automobiles or dual wheel trucks or the like. Thus the flange 11, which is on the inner edge of the skid, constitutes a reinforcing flange and also a guide for the wheels of vehicles being loaded. The flange 15 on the outer edge, which also reinforces the skid, extends downwardly below the track or floor portion of the skid so that if a dual wheel vehicle is run upon the skid, the tires of the dual wheel may project beyond the outer edge of the skid, as shown in Figure 5 of the drawings. Thus it will be apparent that the cross sectional shape of the skid provides for a rigid and strong construction and provides also a guide means which will function not only in the loading of single wheel passenger vehicles but also in the loading of dual wheel trucks or the like.

While the invention has been described with some detail, it is to be understood that the description is for the purposes of illustration only and is not definitive of the limits of the inventive idea. The right is therefore reserved to make such changes in the details of construction and arrangement of parts as will fall within the purview of the attached claims.

What I claim as my invention is:

1. In a skid assembly, a track member provided on its inner edge with an upstanding guide flange which terminates at its upper edge in a laterally extending reinforcing flange capable of functioning as a compression member when the skid is loaded, and provided on its outer edge with a depending reinforcing flange which terminates in a flange extending substantially parallel to said track member but below the same and constituting a tension member when the skid is loaded.

2. In a skid assembly, an elongated substantially rectangular shaped piece of sheet metal, having two of its corners cut on a bias and being bent to provide a straight elongated track portion, an upturned reinforcing and guide flange on one longitudinal edge of said track portion, and a downturned reinforcing flange on the other longitudinal edge of said track portion, the portions of said piece of sheet metal which are cut on a bias providing inclined ends for the front end of one flange and the rear end of the other flange.

3. In a device of the character described, an I-beam constituting a track for the wheels of vehicles to be carried, a separate ground engaging track member straddling the web of the I-beam between the top and bottom thereof at an inclination to said I-beam, a block fixed to the top of said I-beam, a hook member carried by said track member and engaging said block for connecting said track member to said I-beam and means also carried by the track member and engageable with the bottom of the I-beam to maintain the hook member in engagement with the block while the track member is at an inclination to the I-beam.

4. In a device of the character described, the combination with an I-beam, of a skid assembly including a track section having a notched end adapted to receive the web of said I-beam, angle plates secured to the under face of said track section adjacent the notched end thereof, said angle plates having rounded lower edges adapted to rest upon the upper faces of the base of said I-beam, and a hook member carried by one of said angle plates providing a detachable connection between the end of said track section and said I-beam.

5. In a device of the character described, the combination with an I-beam having a top surface constituting a track, of a skid assembly including a track section provided at its forward end with a notch for receiving the end of the web of said I-beam, supporting members fixed to said track section and having rounded bases seating on and supported by the base of said I-beam, a block fixed to the under face of the top of said I-beam, and a hook member fixed to said track section and engaging said block.

In testimony whereof I affix my signature.

IRVING H. JUDD.